United States Patent [19]

Petsetakis

[11] Patent Number: 5,614,276
[45] Date of Patent: Mar. 25, 1997

[54] EXTRUSION OF MATERIALS

[75] Inventor: Menelaos Petsetakis, Athens, Greece

[73] Assignee: Hellenic Plastics and Rubber Industry Memelaos Petsetakis, S.A., Piraeus, Greece

[21] Appl. No.: 64,008
[22] PCT Filed: Sep. 17, 1992
[86] PCT No.: PCT/GR92/00017
§ 371 Date: May 18, 1993
§ 102(e) Date: May 18, 1993
[87] PCT Pub. No.: WO93/05947
PCT Pub. Date: Apr. 1, 1993

[30] Foreign Application Priority Data

Sep. 20, 1991 [GB] United Kingdom .............. 9120121
Jul. 8, 1992 [GB] United Kingdom .............. 9214461

[51] Int. Cl.$^6$ .............................. B29D 23/00; B29D 28/00
[52] U.S. Cl. ................ 428/36.9; 428/36.91; 428/36.92;
428/131; 428/304.4; 425/382.3; 425/382 N;
425/376.1; 264/167; 264/177.16; 264/209.2;
264/173.17
[58] Field of Search ..................... 425/382.3, 382 N,
425/376.1; 428/36.9, 36.91, 36.92, 131,
304.4; 264/167, 171, 177.16, 209.2

[56] References Cited

U.S. PATENT DOCUMENTS

| 3,118,180 | 1/1964 | Nalle, Jr. ................ 425/382 |
| 3,550,202 | 12/1970 | Fairbanks ................ 425/382 |
| 3,947,174 | 3/1976 | Hureau et al. ........... 425/72 R |
| 4,189,292 | 2/1980 | Hureau et al. ........... 425/290 |
| 4,303,609 | 12/1981 | Hureau et al. ........... 264/504 |
| 4,761,129 | 8/1988 | Aste et al. .............. 425/133.1 |
| 4,790,737 | 12/1988 | Fukamachi et al. ....... 425/114 |
| 4,911,872 | 3/1990 | Hureau et al. ........... 264/146 |

FOREIGN PATENT DOCUMENTS

| 1296377 | 5/1969 | Germany . |
| 2102221 | 1/1971 | Germany . |
| 1406642 | 9/1975 | Spain . |

Primary Examiner—James J. Seidleck
Assistant Examiner—Michael A. Williamson
Attorney, Agent, or Firm—Watson Cole Stevens Davis, P.L.L.C.

[57] ABSTRACT

An apparatus and method are disclosed for extruding a product which comprises a longitudinal component, e.g. a tubular sheet and/or longitudinal filaments in a circular array, and transverse filaments which follow a helical path relative to the longitudinal component, whereby the product may consist of a lattice or a reinforced sheet material. The transverse filaments are formed by cooperation between two die parts (101; 102) to which relative movement is imparted so that one part (102) performs a rocking motion progressing around a circular path to influence the extrusion orifice, without rotation of the die parts. The extrusion orifice may comprise an annular slot defined between two die members (106; 108) of the first die part (101) which is held stationary, while the second die part (102) extends around the first part and has an edge for alternatively opening and at least partially closing the slot at each point along its annular extent in response to the relative circular rocking movement imparted to the second part (FIG. 7). Alternatively, the extrusion orifice may be defined between cooperating frusto-spherical surfaces (4, 8) of the two die parts (3, 7) with the inner die part having a groove (9) which is alternately exposed and concealed due to circular rocking motion imparted to this die part (FIG. 1).

35 Claims, 7 Drawing Sheets

EXTRUSION OF MATERIALS

BACKGROUND AND SUMMARY OF THE INVENTION

This invention is concerned with the extrusion of sheets of plastics or other extrudable materials and in particular the invention relates to the manufacture by extrusion of non-uniform sheet materials, i.e., materials which are not of a constant thickness or are of heterogeneous composition, and which term is used herein to include lattice structures of connected filaments, perforated sheets, and sheets incorporating thickness variations or filaments for reinforcement. Furthermore, "sheet material" should be understood to include non-planar forms, such as cylinders, tubes and other sections besides generally flat layers.

In accordance with the invention there is provided an apparatus for extruding non-uniform sheet material comprising die means including a first part at least partly delimiting extrusion orifice means around an axis, and a second part arranged to cooperate with the first part at the orifice means, and drive means for imparting relative movement between the first and second die parts whereby the second part undergoes a rocking motion progressing along at least part of a generally circular path around the axis relative to the first part and thereby the second part influences the extrusion emanating from each section of the orifice means in a periodic manner.

In order to achieve the relative movement of the first and second parts of the die means, the first part, the second part, or both parts may be driven by the drive means.

The first and second parts may have surfaces which cooperate to define the orifice means. In this case the first and second parts provide inner and outer annular die surfaces, which may be arranged to extrude several continuous filaments spaced apart from each other, and to co-extrude by the relative rocking motion transverse filament sections interconnecting and spaced apart along the continuous filaments. The simultaneously extruded transverse and longitudinal continuous filaments can be substantially perpendicular to each other.

In another construction the first die part defines the extrusion orifice means and the second part controls the flow of material through the orifice means or acts on the material flowing out through the orifice means to vary the extrusion obtained from each element or section of the orifice means about the axis. Thus, the second part may, as a result of the rocking motion, open and close an extrusion slot extending about the axis so that flow through the slot is alternately allowed and interrupted and a transverse or helical filament is produced, or the second part may partially open and close an extrusion slot extending about the axis so that the thickness of the sheet extruded therethrough is varied. Alternatively, the second part may be adapted to produce holes in the extruded sheet by temporarily closing off segments of the extrusion orifice to block flow therethrough, or by stamping holes in the extruded sheet.

Moveable members for controlling or varying flow of molten material through annular extrusion slots have been known for many years, but these members are reciprocated, which is a disadvantage from the point of view of operating smoothness and possibly speed. It is also known to extrude filaments between die members which are rotated relative to each other, but the extrusion openings obtained exhibit lozenge-like shapes which can be undesirable. By employing a rocking motion, i.e., a combined pitching and rolling movement without relative rotation of the first and second parts, in accordance with the present invention, smooth continuous high speed operation is facilitated. The invention also offers greater versatility than the prior art, especially regarding the different forms of extrusion which can be manufactured. One novel form of extrusion which can be produced comprises a sheet of material with continuous longitudinal filaments on one side thereof and transverse filaments on the other side thereof, the filaments on at least one side being of a material, e.g. polypropylene, different to the sheet material, e.g. polyethylene.

The first and second die parts preferably have annular frusto-spherical surfaces in sliding contact for guiding the two parks for the relative movement which is about the geometric centre of the frusto-spherical surfaces, and for sealing the die parts to each other to prevent ingress of extrusion material between them. It is preferable that one die part remains stationary while the other die part is moved, and most conveniently the first die part, i.e. the inner part, is fixed and the second or outer part is driven with the circular rocking motion.

It will be appreciated that the apparatus of the invention is mainly aimed at producing an extrusion consisting of a generally annular curtain with means, e.g. a row of holes, a reinforcing filament or increase in thickness, or a slot, which extends helically about the curtain. However, it is not essential for the orifice means to extend around a complete annulus and a longitudinally slit tubular extrusion, or longitudinal extruded strips could be produced.

The present invention also resides in a method of producing an extruded sheet, comprising extruding material through an extrusion orifice means extending at least partly around an axis, and varying the form of the extrusion emanating from the orifice means by imparting relative movement between first and second die parts so that the second die part performs with respect to the first die part a motion progressing repeatedly along at least part of a generally circular path without rotation about the axis. Most conveniently the movement is a circular rocking motion.

In addition, the invention provides an extrusion of generally cylindrical configuration having at least one continuously longitudinally extruded element and a feature extending helically therealong and formed during the extrusion process.

The helical feature may be a helical filament or a reinforcement produced by an extruded filament or an increase in thickness. Alternatively, it may be a row of holes in the extrusion or even a continuous slit. The basic cylindrical extrusion may comprise a series of separate parallel elements or a continuous sheet.

The present invention will be of particular benefit in the production of extruded lattice structures having a plurality of parallel longitudinal filaments and at least one continuous extruded helical filament interconnected with the longitudinal filaments, such structures being suitable for subsequent stretching to form plastics nets, e.g., for agricultural and horticultural uses.

Some embodiments of the invention will now be described, by way of example only, with reference to the accompanying drawings.

DETAILED DESCRIPTION OF THE PREFERRED EMBODIMENTS

Figure 1:
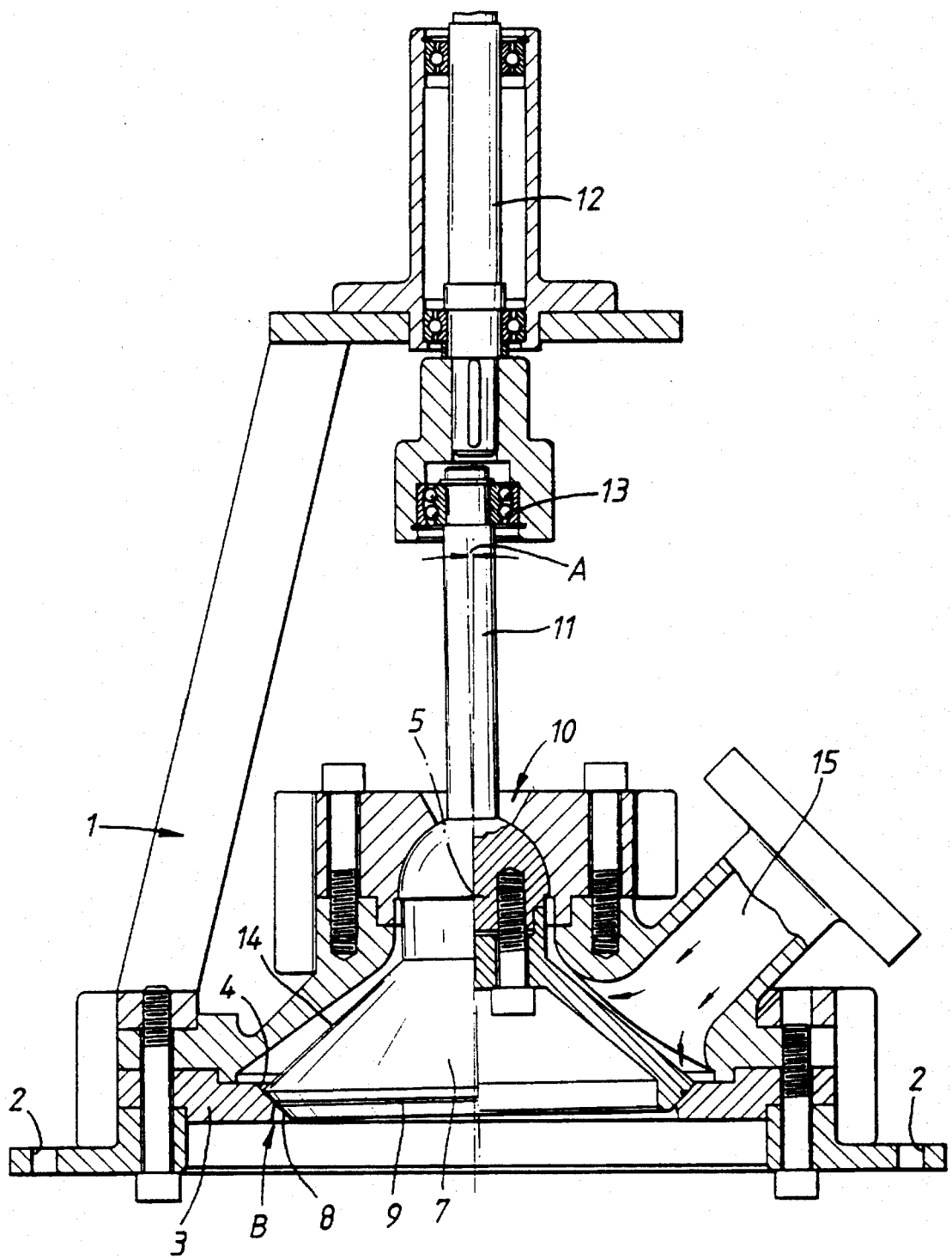
FIG. 1 is a partially sectioned side elevation of an embodiment of extrusion apparatus according to the present invention.
Figure 2:
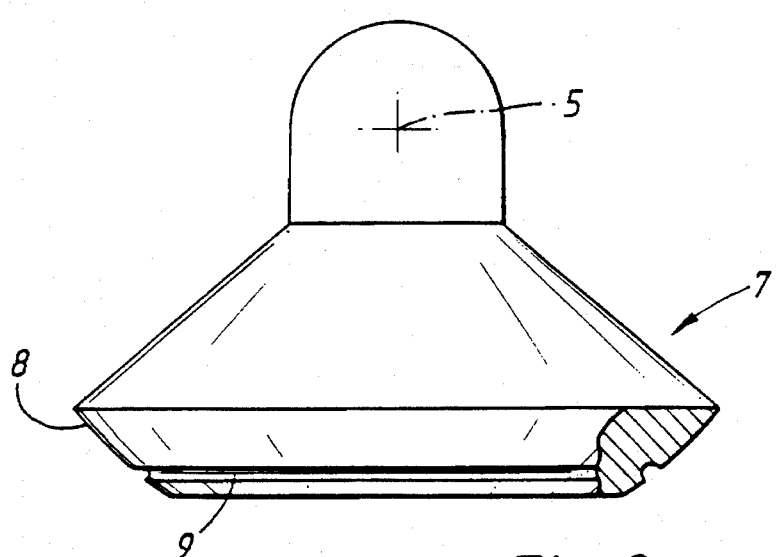
FIG. 2 is a partially sectioned side elevation of a first die portion of a variant of the FIG. 1 apparatus.
Figure 3:
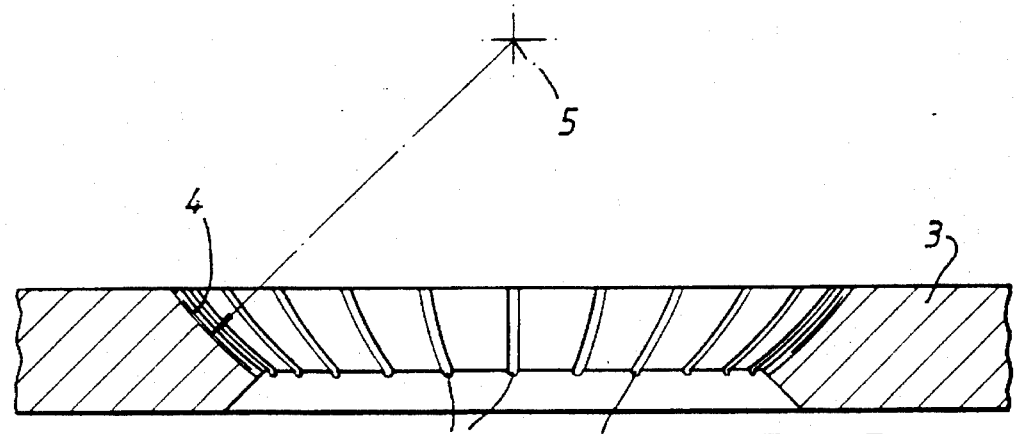
FIG. 3 is a sectioned side elevation of the other die of the FIG. 2 variant of the FIG. 1 apparatus.

The extrusion apparatus shown in FIG. 1 comprises a main body, indicated generally at 1. This main body 1 is intended to be rigidly attached, via bolt holes 2, to a further structure (not shown). The main body 1 comprises a die portion 3 having an annular concave frusto-spherical die surface 4, the curvature of which is centred around a geometric centre 5. The die surface 4 is provided with a plurality of grooves or channels 6. Although in FIG. 3 the grooves 6 are shown as being equi-sized and equi-spaced, they may, as will become apparent, be irregularly spaced and/or of different sizes. Furthermore, although shown as extending in vertical planes, the grooves 6 may be angled relative to the planes.

The apparatus also comprises a second die portion 7. This die portion has an annular convex frusto-spherical die surface 8. The radius of curvature of the surface 8 is the same as that of the die surface 4, with the result that, when assembled together as shown in FIG. 1, the geometric centres 5 of the two die surfaces 4, 8 are coincident.

The die portion 7 is shown as being provided with a single groove 9 extending continuously around the annular extent of the die surface 8. As will later become apparent, the die surface 8 need not be limited to a single groove 9 and the groove or grooves need not extend fully around the circumference of the die surface 8.

In use, when the annulus of the convex die surface 8 is received within the annulus of the concave die surface 4, with the die surfaces 4, 8 in contact as shown in FIG. 1, the second die portion 7 is moved in a combined rolling and pitching motion relative to the first die portion 3, so that die surface 8 slides over die surface 4. This circular rocking motion will hereinafter be referred to as "wobbling".

When wobbling, the second die portion 7 does not rotate or yaw about its central generally vertical axis relative to the first die portion.

In order to accommodate wobbling of the second die portion 7, the second die portion and the main body 1 are provided with a ball and socket type universal joint 10. The ball of the second die portion 7 is rigidly attached to a rod 11, the axis of which is offset by an angle A from the vertical axis of the main drive shaft 12, To wobble the second die portion 7, the shaft 12 is rotated by drive means (not shown). The offset angle A causes the upper end of rod 11 to orbit around the vertical axis of the main drive shaft 12 with the axis of the rod 11 scribing out the shape of a cone having a cone angle of 2A and having point 5 as the apex of the cone. Rod 11 does not rotate about its own axis, the bearing 13 preventing rotational drive from being transmitted from the main drive shaft 12 to the rod 11.

The angle A may be varied by adjusting the horizontal offset of the bearing 13 from the axis of the shaft 12. A suitable offset threaded adjustment device is shown in close-up in FIG. 5.

The means illustrated in FIG. 1 for wobbling the second die portion 7 is just one way of achieving the desired motion. It will be appreciated that other means for achieving the desired wobbling motion may alternatively be employed.

To extrude a cylindrical lattice, molten thermoplastics material such as, for example, polypropylene or polyethylene is forced under pressure from an extruder into the chamber 14 defined between the two die portions, via inlet 15. This results in the extrusion, from the plurality of passages defined jointly by the die surface 8 and the grooves 6 provided in the die surface 4, of a plurality of generally parallel longitudinally extending continuous filaments or threads 16. These form a generally cylindrical shape similar to that shown in FIG. 6.

Figure 4:
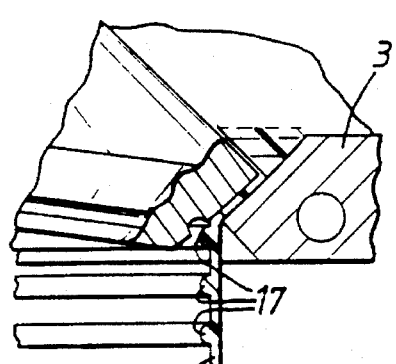
FIG. 4 is a partially sectioned side elevational view of the die surface portions of FIGS. 2 and 3.

In use, the majority of the annular extent of groove 9 is closed by the die surface 4 of the first die portion 3, as shown in the right-hand half of FIG. 1. In this condition the grooves 6 allow for the feed of molten thermoplastics material into the groove 9. However, the inclination of the second die portion 7, arising from its wobbling motion, causes a small portion B of the groove 9 to be exposed below the level of the concave die surface 4, as shown in the left-hand half of FIG. 1 and in FIG. 4, causing the plastics material contained in portion B of groove 9 to be extruded as a thread or filament 17. This filament 17 is extruded with the longitudinal filaments 16 and is integrally united therewith. The drawing of the longitudinal filaments 16 helps to draw the filament 17 out of groove 9.

Figure 6:
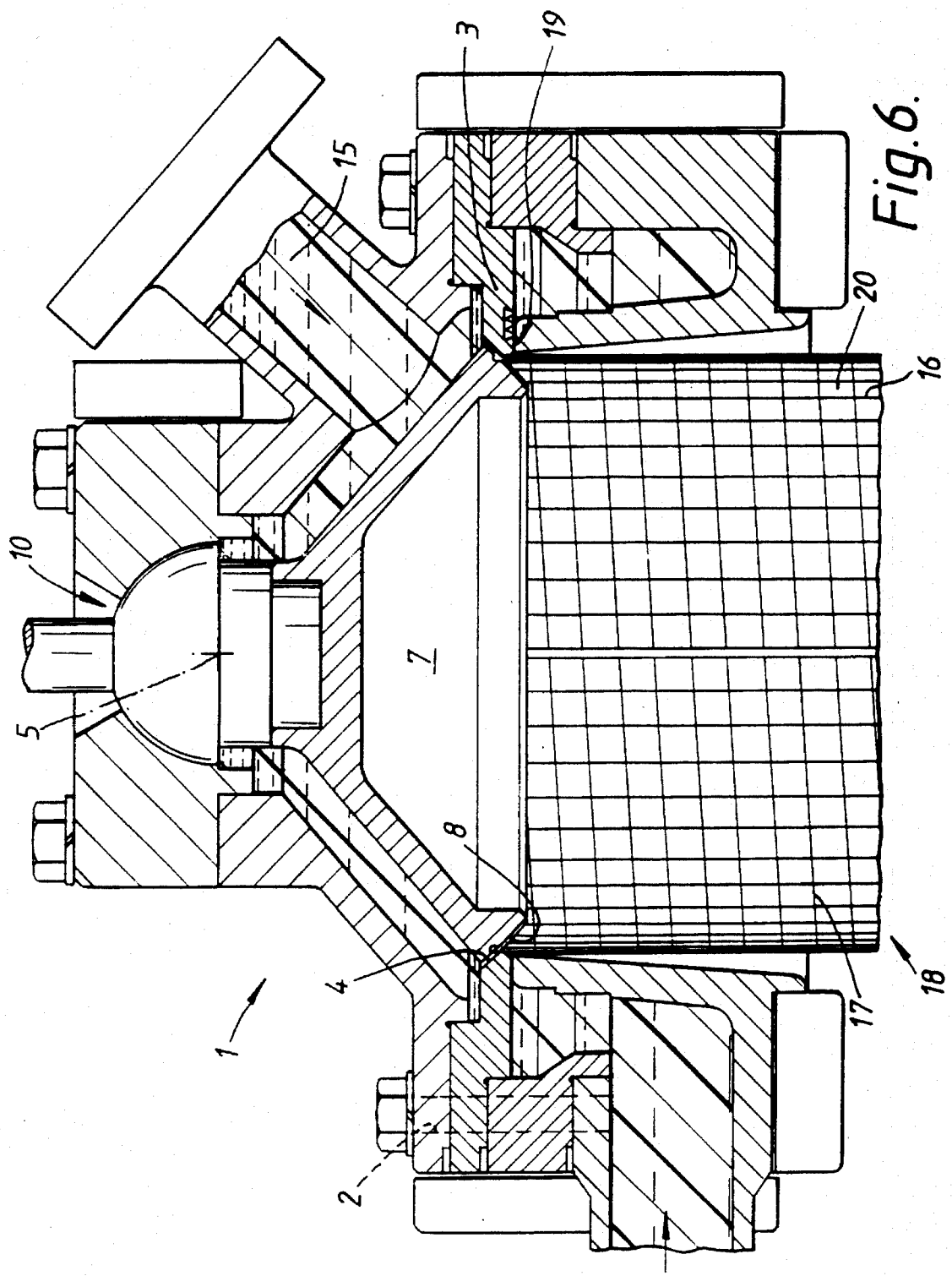
FIG. 6 is a partially sectioned side elevation of a further embodiment of extrusion apparatus according to the present invention.

Although the second die portion 7 does not rotate relative to the first die portion 3, the effect of the wobbling motion is to cause the exposed portion B of the groove 9 to progress around a circular path. The exposed portion B of the groove 9 travels a full circuit around the annulus of die surface 4 for each complete revolution of the drive shaft 12. The movement of the exposed portion B in a circular path causes the filament 17 to be continuously extruded thereby interconnecting the longitudinal filaments 16 to form a generally cylindrical lattice structure 18, similar to that shown in FIG. 6. Due to the continuous extrusion of the longitudinal filaments 16, the form of the extruded filament 17 is generally helical, as shown in FIG. 6.

By varying the rate of wobble of the second die portion 7 relative to the rate of extrusion of the longitudinal filaments 16, the pitch of the helical filament 17 may be varied to change the size of the apertures in the lattice 18. A suitable wobble rate for the second die portion 7 may, for example, be of the order of around 4,000 cycles per minute.

Where the extruded lattice 18 is required to be planar, for example for use in the manufacture of sheet netting, after extrusion the extruded generally cylindrical lattice may be slit along one side to allow it to be folded out flat. Alternatively, to avoid the need to slit the generally cylindrical lattice, the groove 9 may be modified to be non-continuous, for example so that it only extends around die surface 8 for a proportion of its total circumference, for example extending only 340° around the circumference of the die surface 8. In this way, the filament 17 that will be extruded from groove 9 will be discontinuous, forming a broken helix with the helical filament sections being spaced apart along the longitudinal filaments 16.

If a plurality of planar lattice strips are required to be extruded, groove 9 may be provided with more than one interruption. The spacing of grooves 6 in the die surface 4 may also be varied accordingly.

When the lattice is for use in the manufacture of netting, the extruded lattice may need to be stretched in two mutually-perpendicular directions, in known manner. To facilitate this stretching operation, the longitudinal filaments 16 which will form the edges of the planar lattice may advantageously be made thicker than the remainder of the longitudinal filaments so as to increase their resistance to tearing from the remainder of the lattice during stretching. This increase in thickness of the longitudinal filament 16 may simply be achieved by increasing the size of the grooves 6 from which the thickened filaments are to be extruded.

Although one use of the apparatus of the present invention is to produce a lattice of flexible filaments which may be used in the manufacture of flexible netting, either with or without subsequent biaxial stretching, the apparatus may be used to produce a comparatively rigid lattice structure for other purposes.

For a given rate of extrusion of the longitudinal filament 16, it may be necessary to vary one or both of the amplitude of the wobbling motion, by varying the offset angle A, and the rate of wobble of the second die portion 7, so as to achieve the optimum conditions for extrusion of the lattice.

Although the second die portion 7 is shown as being provided with a single groove 9, it may be provided with more than one groove so as to simultaneously extrude more than one helical filament 17. As an alternative, or in addition, to the illustrated arrangement, in which the groove 9 is supplied with thermoplastics material by the action of grooves 6, separate feed means (not shown) may be provided for supplying the or each groove 9 with molten thermoplastics material.

Figure 5:
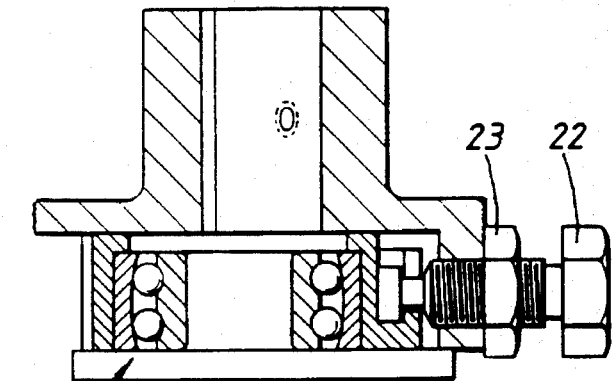
FIG. 5 is a sectioned side elevation, on a different scale, of a variant of the offset adjustment device of the FIG. 1 apparatus.

To vary the size of the exposed portion B of the groove 9, the angle A may be varied using a threaded adjustment device of the type shown in FIG. 5 to alter the offset of the bearing 13 from the axis of shaft 12. Although the device shown in FIG. 5 is manually adjustable, by screwing bolt 22 in or out and locking it in position with locknut 23, this device may advantageously be adjusted remotely, for example by an electric stepper motor, so that the angle A may be varied while the apparatus is in use without needing to shut down the wobbling motion.

Although it is the stationary die portion 3 which is shown as being provided with the grooves 6 for extruding the longitudinal filaments, they may instead be provided on the wobbling die portion 7. Similarly, the annular groove or grooves may be provided on the stationary die portion rather than the wobbling die portion 7. Furthermore, although it is the central die portion 7 of the two dies 3, 7 which is shown as wobbling, the external die portion 4 may alternatively, or additionally, be arranged to wobble.

The groove or grooves 9 and some or all of the grooves 6 may be provided on one of the die portions, preferably on the central die portion.

In a modification of the apparatus of the FIG. 1 embodiment, the apparatus of the present invention may additionally be provided with further extrusion means, for example as shown in the FIG. 6 embodiment. In FIG. 6, an additional die portion 19 is provided adjacent the die portion 3. A continuous annular or part annular gap is provided between the die portions 3, 19 so that a film 20 of molten thermoplastics material, delivered under pressure to space 21, is extruded through the gap to form a continuous extruded cylinder or part of a cylinder. Because the film 20 is extruded directly adjacent the point of extrusion of the filaments 16, 17, the lattice formed by these filaments is united to the film 20 to form a film with an integral lattice structure.

As with the grooves 6, 9, the size of the gap or gaps between the die portions 3, 19 may be varied to alter the thickness and/or size of the extruded film or films.

In FIG. 6, the film is shown as being extruded onto the outside of the lattice of filaments. A film may alternatively, or additionally, be extruded onto the inside of the filament lattice 18 by other extrusion means, not shown.

Figure 7:
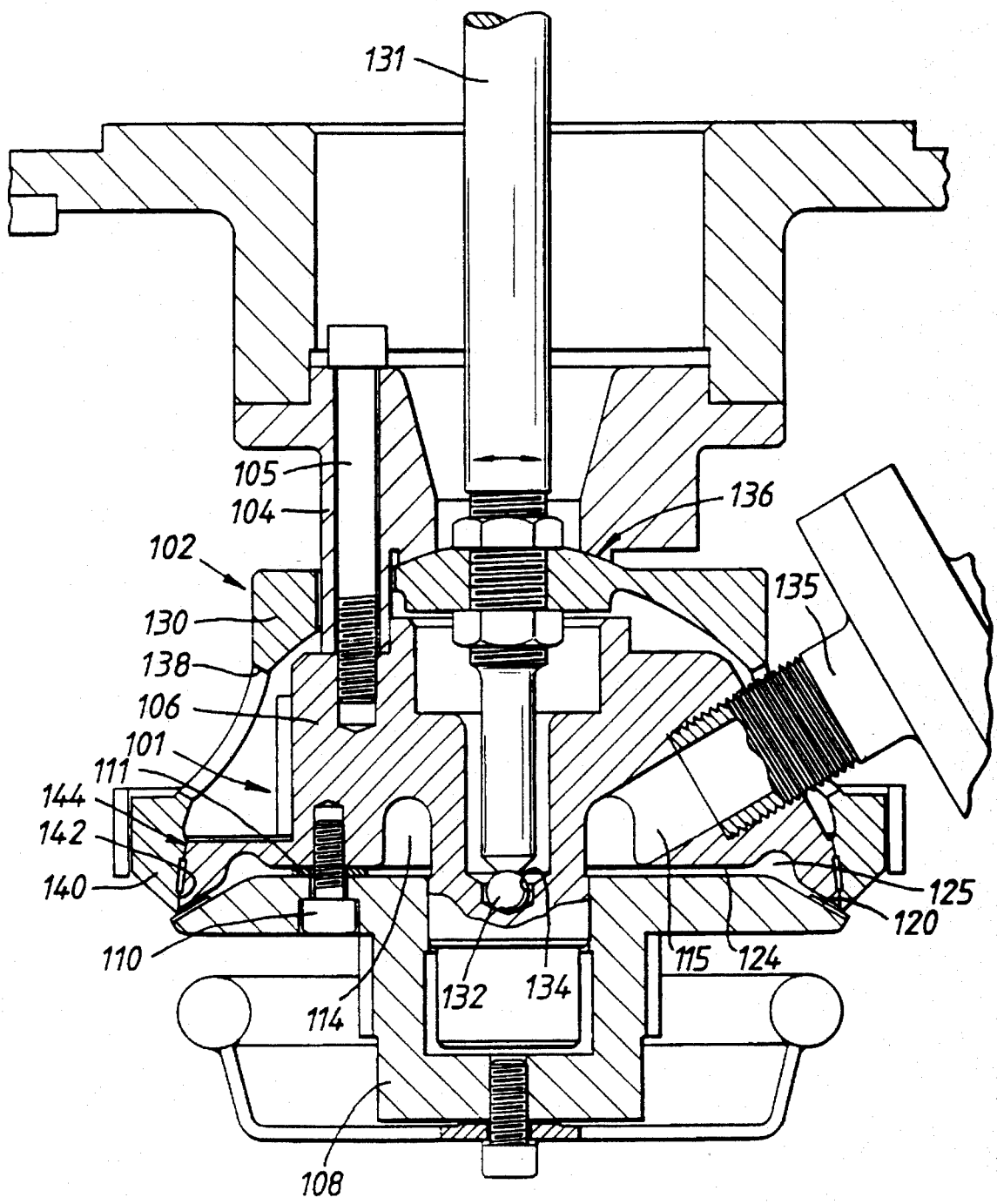
FIG. 7 is an axial cross section through another extrusion apparatus embodying the invention.
Figure 8:
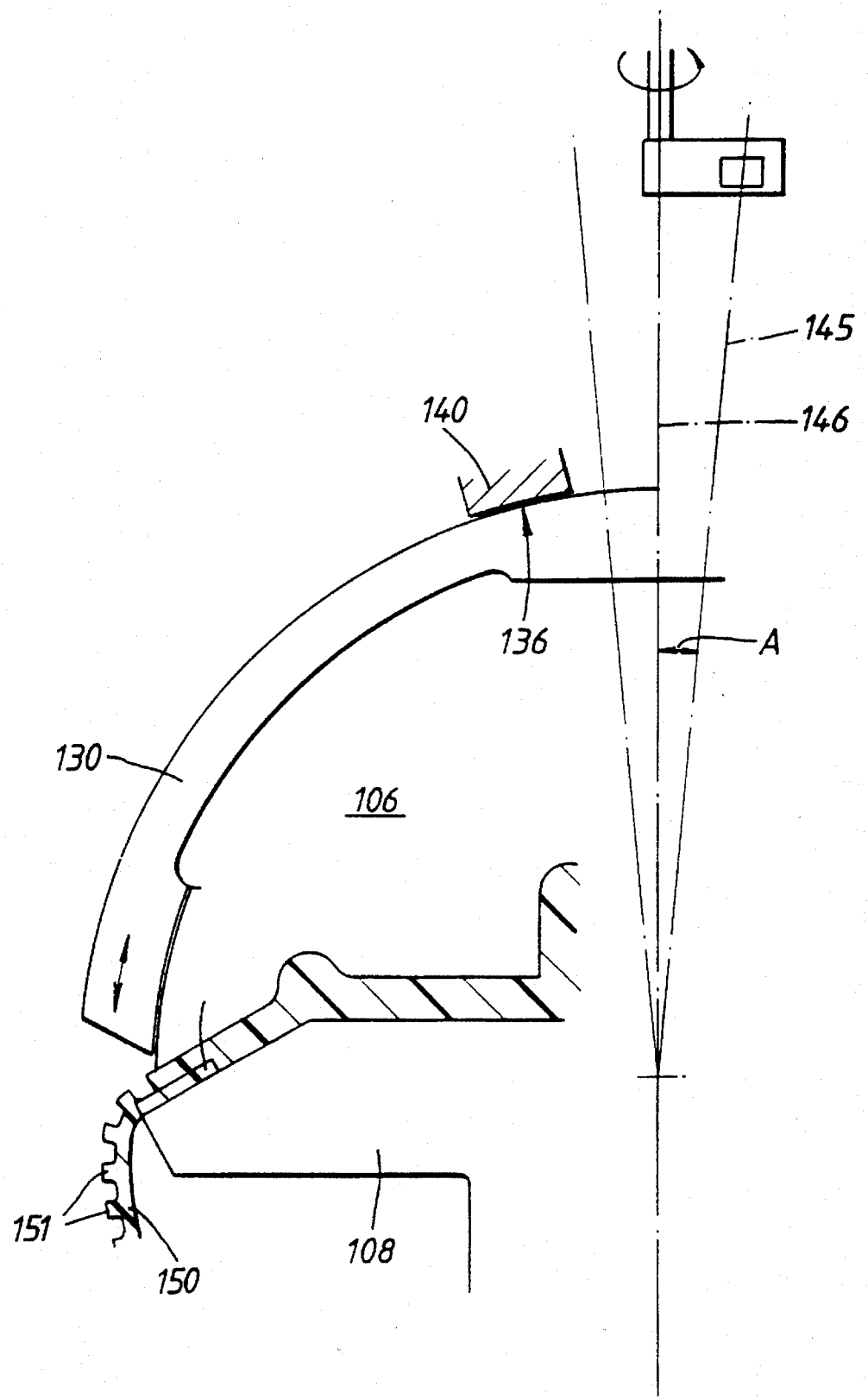
FIG. 8 is a sketch illustrating on a larger scale part of the apparatus in FIG. 7.

The extrusion apparatus shown in FIGS. 7 and 8 has a stationary inner part 101, and a movable outer part 102 which surrounds the inner part. The die part 101 is fixedly mounted to a frame 104 by bolts 105 (only one shown). The die part 101 comprises upper and lower die members 106, 108 fastened together by bolts 110, and held at a certain distance apart by shims or washers 111 surrounding the bolts 110. The upper and lower die parts confine between them a reservoir chamber 114 to which molten plastics is delivered, in use of the apparatus, through an inlet 115 and from an extruder. Extending around the periphery of the inner die part 101 is an annular extrusion orifice defined between confronting surfaces of the upper and lower die members 106, 108. In the illustrated embodiment the confronting surfaces delimiting the extrusion orifice are frusto-conical, but this shape is not essential and they could be planar instead. As shown, the surface of the lower member 108 is provided with a series of grooves 120, directed radially, and spaced around the annular orifice. Molten plastic material is fed to the orifice from the reservoir chamber 114 via a radial passage 124 and an annular auxiliary chamber 125.

The movable part 102 comprises a generally hemispherical member or bell 130 rigidly fastened to a drive rod 131 which extends through the bell and is provided at its lower end with a ball 132 received in a socket 134 defined in the upper die member 106 and defining a centre of articulation about which the rod, and hence the bell, can rock relative to the inner die part 101. The bell includes openings through which the mounting bolts 105 and the inlet connection 135 pass with sufficient clearance to accommodate the movement of the bell as described below. Additional openings e.g. as denoted by the numeral 138 may be provided to ensure rotational balancing. The bell has a part-spherical surface 136 portion on the uppermost part thereof for cooperation with a complementary bearing surface provided on the supporting frame 104, these surfaces being centred on the geometric centre of the ball 132. Furthermore, the bell carries a ring or collar 140 which in the particular construction illustrated consists of an integral rim portion of the bell. The ring 140 has a frusto-spherical inner bearing surface 142 centred on the centre of the ball 132, and the upper die member 106 has a complementary frusto-spherical bearing surface 144, these two surfaces being in sliding contact and sealing between the bell 130 and die member 106.

The axis 145 of the drive rod 131, and hence the axis of symmetry of the bell 130, are inclined at a small angle A to the axis 146 of the inner die part 101, and the rod is connected to a drive mechanism, which may be exactly as described above in connection with FIGS. 1 and 5, for imparting an orbital movement to the upper end of the rod 131 so that the axis of the rod describes the surface of a cone and the bell 130 wobbles around the inner die part 101 with a circular rocking motion. Due to this relative movement between the inner and outer die parts 101, 102, the lower edge of the collar 140 is, at each position around the extrusion orifice, alternately raised, to open completely the orifice, and lowered to close the orifice above the grooves 120. As a result there are extruded continuous elongate filaments 150 produced by the grooves 120, and a helical filament 151, formed due to the slot opening above the grooves 120 precessing around the extrusion die, which helical filament is transverse to and interconnects the longitudinal filaments.

Exactly as mentioned above in connection with FIG. 1, the extruded tubular lattice structure obtained may be slit longitudinally and subjected to biaxial stretching for the production of netting. Also the numbers, the relative spacing and the size of the grooves 120 may be varied in accordance with the characteristics of the extrusion desired. The annular slot of the extrusion orifice could be interrupted so that the slot is not completely annular and in this case the helical filament would have corresponding interruptions and the generally cylindrical extrusion obtained would have a longitudinal slot so that a separate slitting operation would be unnecessary. By adjusting the inclination angle of the rod 131, the stroke of the ring 140 relative to the extrusion orifice is variable. Thus, the ring may be adjusted so that a lower part of the peripheral extrusion slot remains constantly open and in this case the extrusion produced would consist of a continuous sheet or film with longitudinal filaments or ribs on one side and a helical filament or rib on the other side. Of course, the grooves 120 could be omitted then there would be produced a sheet, with a helical rib or filament on one side. This arrangement may be suitable for producing pipes or tubes with smooth inner surfaces and reinforced by ribs extending around their external surfaces.

Instead of defining a plane edge the ring 140 may have a series of needles or other projections spaced around its perimeter for cooperation with the overhanging, i.e. protruding surface of the lower die member 106, for perforating the sheet emanating from the extrusion orifice. If there is a castellated edge on the ring the castellations may define apertures for extrusion of longitudinal filaments and, due to the wobbling motion of the bell, may be lifted completely clear of the opening to form a helical filament which interconnects the longitudinal filaments.

It will be appreciated that in operation of the apparatus described above, the pitch between adjacent helical filaments will depend on the material extrusion rate, and the time taken for the bell to complete one cycle of its wobbling motion and hence one opening and closing cycle at any point around the extrusion orifice.

Many modifications to the apparatus are possible without departing from its fundamental operating principles and as examples of such modifications the following may be mentioned:

a) Instead of having to replace the entire lower member 108 to change the number, size, and/or relative positioning of the grooves 120, it could be provided with a detachable, replaceable, peripheral ring incorporating the grooves.

b) The bell 130 could be equipped with a readily detachable and replaceable rim portion for varying the edge formation to suit the particular extrusion to be produced.

c) The edge of the ring 140 which cooperates with the lower die member may be made larger or smaller to increase or decrease respectively the width of the slots between adjacent sections of helical filament.

d) It is not necessary for the lower die member 108 to protrude beyond the edge of the upper die member, and its outer edge could be flush with that of the upper die member. The ring 140 may then be arranged to extend across both edges. In this way the ring could provide a knife edge so that a continuous helical strip is extruded, the width of the strip being determined by the extrusion rate and the speed of movement of the bell. As another alternative the ring may define a comb, the teeth of which usually extend across the annular slot but are lifted free of the slot to produce a helical thread interconnecting the longitudinal threads extruded between the teeth.

e) The reservoir chambers and feed channels within the inner part 101 could be arranged to conduct the molten plastics material to grooves formed in at least one of the two cooperating bearing surfaces 142, 144, and conveniently in the surface 144 only. The grooves could be arranged as described above in connection with FIGS. 1–6 so that a lattice structure is extruded directly between the ring 140 and die member 106. If an annular extrusion orifice is also provided the apparatus can extrude a sheet with a lattice structure of longitudinal and transverse threads on the outer surface of the sheet. By provision of respective material supplies, and feed channels, the sheet and lattice structure may be formed of different materials.

f) The grooves 120 at the extrusion orifice do not have to be all the same size. For example, if the cylindrical extrusion is to be slit longitudinally the grooves which form the longitudinal filaments immediately either side of the slit could be made larger in cross section so that these filaments will be correspondingly stronger. Also the annular extrusion orifice, or the edge of the ring 140, could be adapted at the peripheral region where the extrusion is to be slit, to produce a thinner and weaker helical filament section whereby the slitting operation will be facilitated. Of course, as mentioned above, they could even be arranged to interrupt the helical filament so that a separate slitting operation is unnecessary.

g) If the grooves 120 are omitted there can be produced a sheet with a helical rib or filament on one side, as stated above. An additional extrusion orifice in the form of a slot may be located to produce a further layer, e.g. of a different material, covering the sheet with the helical rib, and the composite thus formed could be subjected to a forming process so that the tubular product obtained has a smooth surface both inside and out.

These modifications are not exhaustive and others are possible without departing from the basic principles underlying the invention. Modifications (a) and (b) enable the same apparatus to be readily adapted to produce a variety of different extruded products. Adjustment of the bell 130 on the drive rod 131 allows the bearing surfaces 142, 144 to be easily adjusted for sealing contact. Of course, the adjustments permitted by the drive mechanism to the speed at which the drive rod 131 revolves and to its angle of inclination A which determines the stroke of the ring during the wobbling movement of the bell, also enable the apparatus to be adjusted to alter the precise form of the extrusion which is produced. As with the embodiments of FIGS. 1–6, the extrusion may be subjected to biaxial stretching for the manufacture of netting products. Thus, a net 3–4 meters in width may be obtained from an extrusion apparatus with a diameter of about 35 cms.

Figure 9:
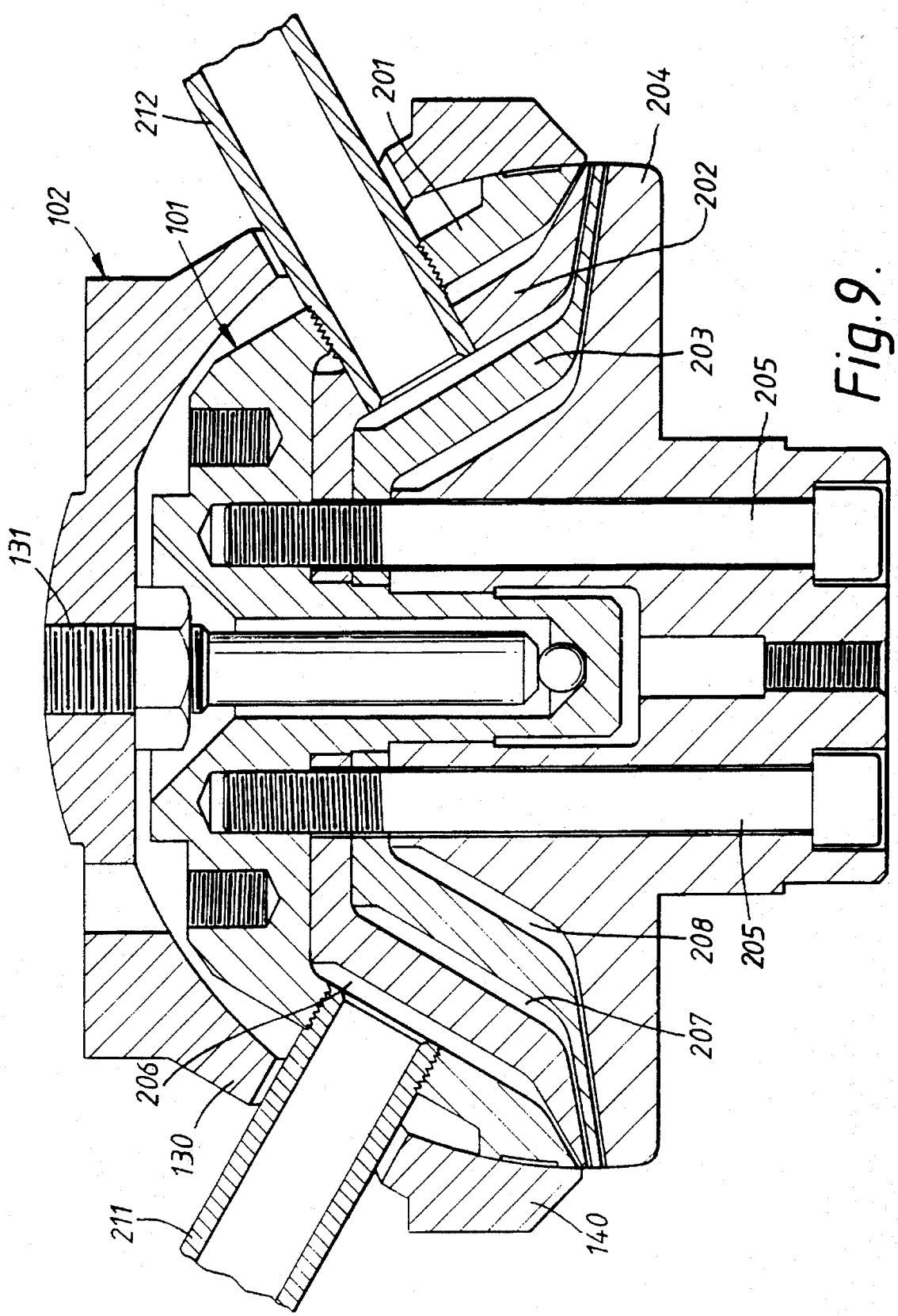
FIG. 9 is an axial cross section illustrating an apparatus for co-extruding several layers of material.
Figure 10:
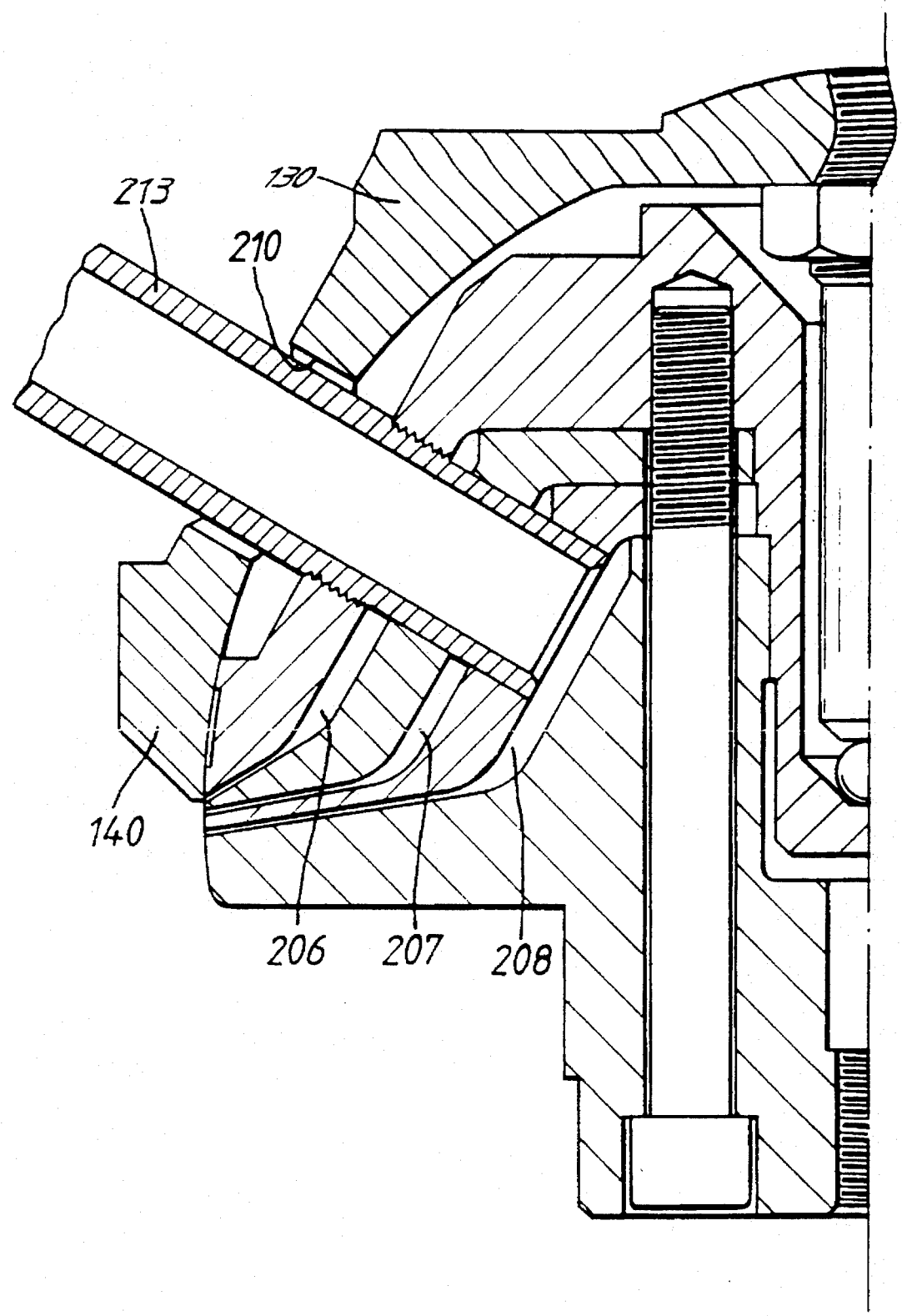
FIG. 10 illustrates another section through the apparatus of FIG. 9.

FIGS. 9 and 10 illustrate a modified form of the apparatus of FIGS. 7 and 8 which is suitable for producing composite extrusions. The inner part 101 is assembled from four members 201, 202, 203 and 204 clamped together by bolts 205. Three reservoir chambers 206, 207, 208 which are sealed from each other are confined between the adjacent pairs of stationary die members 201–204, and respective inlet connections 211, 212, 213 are fastened to the inner die part for conducting molten plastics from extruders to the respective chambers 206–208. The connections extend outwardly through respective openings 210 in the bell 130 which is the same as in the previous embodiment. The reservoir chambers are connected by internal feed channels to respective extrusions orifices at the periphery of the stationary die part. The orifice associated with chamber 206 is controlled by the edge of the bell ring 140 and may be an annular slot about the circumference of the stationary die part. Thus, as the bell 130 is driven with a wobbling movement due to the angular offset of the drive shaft 131, the slot at each position along its length is alternately opened and closed with the result that a helical thread or filament is extruded. The other extrusion orifices are not influenced by the bell. The orifice fed from cheer 207 may also be a circumferential extrusion slot so that it will produce a continuous tubular film or pipe, and the chamber 208 may supply a plurality of extrusion apertures distributed around the circumference for producing continuous longitudinal filaments. Thus, the extruded product obtained will consist of a tube with longitudinal reinforcing filaments integral with its inner surface, and a continuous helical reinforcing filament united with its outer surface. It will be appreciated the chambers 206–208 can be supplied with different materials for producing a composite co-extruded product. For example, the chambers 206 and 208 may be supplied with polypropylene for the transverse and longitudinal filaments and polyethylene may be delivered to chamber 207 for the tubular sheet. With respect to the helical thread, its pitch will be dependent on the extrusion rate and the wobbling speed of the bell, and its thickness will depend on the width of the extrusion slot.

Many of the modifications and variable constructional features explained above are applicable also to the embodiment of FIGS. 9 and 10.

Whereas in the embodiments of FIGS. 7 to 10 the extrusion slot is defined in the inner die part and the outer part, i.e. the bell, is driven with the wobbling movement to influence the extrusion, it should be understood that this general arrangement could be reversed so that the outer die part is stationary and includes an inwardly directed extrusion slot, and the inner die part is driven with a circular rocking motion to influence the extrusion. The alternative forms described above for the extrusion orifices and the edge of the moving die part which cooperates with the orifices are, at least for the most part, applicable to both these arrangements. Furthermore, it is not essential for the bell to have an operative portion or edge for influencing the extrusion which extends around a complete circle, and in such a case the relative rocking motion between the die parts need only progress repeatedly through part of a circular path.

While specifically described herein in relation to the extrusion of plastics, the invention is also applicable to the manufacture of extrusions from other materials, such as metal.

I claim:

1. An apparatus for extruding non-uniform sheet material, comprising a die including a first part defining at least one extrusion orifice disposed around an axis, and a second part, the first die part having a convex annular frusto-spherical surface and the second die part having a concave annular frusto-spherical surface of substantially the same radius as the convex frusto-spherical surface, said surfaces being in sliding cooperation adjacent said extrusion orifice, and said surfaces being centered at a geometric centre lying on said axis, and drive means for imparting relative movement between the first and second die parts, whereby seen relative to first part, the second part undergoes a rocking motion progressing along at least part of a generally circular path extending around said axis whereby the second die part influences the extrusion emanating from each orifice section in a periodic manner without extrusion of material between said sliding surfaces.

2. An apparatus for extruding non-uniform sheet material, comprising a die including a first part at least partially defining at least one extrusion orifice disposed around an axis, and a second part arranged to cooperate with the first part at said orifice, the first die part having a convex annular frusto-spherical surface and the second die part having a concave annular frusto-spherical surface of substantially the same radius as the convex frusto-spherical surface, said surfaces cooperating adjacent the orifice, said surfaces being centered at a geometric centre lying on said axis, drive means for imparting relative movement between the first and second die parts, whereby seen relative to first part, the second part undergoes a rocking motion progressing along at least part of a generally circular path extending about said axis and thereby influences the extrusion emanating from each orifice section in a periodic manner, the second die part being supported by a spherical bearing centered on the centre of the rocking motion, and a chamber defined within the first die part and communicating with the orifice for supply of molten material thereto, the second part contacting the molten material only at a circular edge portion thereof in cooperation with the orifice, and said spherical bearing being free from contact by molten material.

3. An apparatus according to claim 1 or claim 2, wherein the first die part defines an extrusion orifice in the form of an extrusion slot extending at least partly around said axis.

4. An apparatus according to claim 3, wherein the second part is so arranged that, at least at certain positions along said slot, the second part (102) alternately opens and closes at least partially said slot in response to said relative circular rocking movement between said parts.

5. An apparatus according to claim 3, wherein the second part is provided with projection elements arranged to press holes in the extrusion emanating from the slot.

6. An apparatus according to claim 4, wherein the extrusion slot is defined between confronting surfaces, and one of said surfaces includes grooves for extruding continuous longitudinal filaments.

7. An apparatus according to claim 3, wherein the first part includes two members defining the extrusion slot therebetween, at least a portion of one of said member being adjustable or replaceable or adjustable and replaceable to change the configuration of the extrusion slot.

8. An apparatus according to claim 4, wherein the extrusion slot is annular, and the second die part includes a circular edge portion, so arranged that in operation there is extruded through the slot a continuous helical filament.

9. An apparatus according to claim 1, wherein the die defines an extrusion slot in addition to said orifice, the extrusion slot extending about said axis for co-extruding a continuous film united with the extrusion produced through said orifice.

10. An apparatus according to claim 9, wherein the extrusion orifice and said additional extrusion slot are connected to respective inlets for supply of different materials thereto.

11. An apparatus according to claim 9, wherein the additional extrusion slot is defined by the first part of the die means.

12. An apparatus according to claim 1, wherein in the first part is located within the second part and the orifice faces away from said axis.

13. An apparatus for extruding non-uniform sheet material, comprising a die including a first part at least partly delimiting an extrusion orifice disposed around an axis, and a second part arranged to cooperate with the first part at said orifice, said first and second die parts having annular frusto-spherical surfaces with sliding cooperation between said surfaces, one of said frusto-spherical surfaces being concave and the other frusto-spherical surface being convex with substantially the same radius of curvature as the concave frusto-spherical surface, said surfaces being centered at a geometric centre lying on said axis, a drive rod fastened rigidly to the second die part and inclined to said axis, and drive means coupled to the drive rod for driving the end of the rod remote from the second die part with an orbital movement of about said axis, whereby relative to first part, the second part undergoes a rocking motion progressing along at least part of a generally circular path around said axis and thereby influences the extrusion emanating from each orifice section in a periodic manner.

14. An apparatus according to claim 13, wherein the drive rod is journaled to the first die part by a ball and socket joint defining a centre about which the first and second die parts are constrained to move relative to each other.

15. An apparatus according to claim 13, wherein the drive means comprises a bearing housing rotatable about said axis, and a bearing mounted in the bearing housing eccentrically with respect to said axis, the end of the drive rod being journaled in said bearing.

16. An apparatus according to claim 15, wherein the bearing housing is provided with means for adjusting the eccentricity of the bearing and thereby the inclination of the drive rod to the axis.

17. An apparatus according to claim 13, wherein the drive means is adjustable to vary the stroke of the rocking motion.

18. An apparatus according to claim 13, wherein the first part comprises an inlet for delivery of material to be extruded to a chamber communicating with the orifice.

19. An apparatus according to claim 13, wherein the first and second die parts have surfaces (4, 8) cooperating to define the orifice therebetween.

20. An apparatus according to claim 19, wherein the cooperating surfaces comprise grooves for extruding continuous longitudinal filaments spaced apart from each around said axis, and extruding longitudinally spaced transverse filament sections interconnecting adjacent longitudinal filaments.

21. An apparatus according to claim 20, wherein a substantially annular groove extending around said cooperating surfaces is provided for extruding said transverse filament sections as a substantially continuous helical filament.

22. An apparatus according to claim 20, wherein the die means defines an extrusion slot additional to said orifice means for co-extruding a continuous film united with said filaments.

23. An apparatus according to claim 1, wherein the first die part is stationarily mounted on a frame and the second die part is coupled to the drive means.

24. A method of producing non-uniform sheet material by extrusion, comprising the steps of extruding material through a substantially annular slot disposed around an axis and defined by a first die part, feeding molten material to the slot via a chamber defined entirely within the first die part, and varying the form of the extrusion emanating from the slot by imparting movement to a second die part relative to the first die part, the first die part having a convex annular frusto-spherical surface and the second die part having a concave annular frusto-spherical surface of substantially the same radius as the convex frusto-spherical surface, said surfaces being in sliding cooperation adjacent said extrusion orifice, and said surfaces being centered at a geometric centre lying on said axis, said movement consisting of a rocking motion progressing along at least part of a generally circular path without rotation about the axis, and the rocking motion causing the second die part alternately to open and close at least partially the slot at each position therealong.

25. A method according to claim 24, wherein the first and second die parts have respective frusto-spherical surfaces held in sliding contact with each other during the relative movement.

26. A method according to claim 24, wherein the first die part is held stationary and said second die part is driven to produce said relative movement.

27. A method according to claim 24, wherein the length of the stroke of said rocking motion is adjusted.

28. A method according to claim 24, wherein a plurality of continuous longitudinal filaments are extruded through orifices defined by the first die part and transverse filament sections interconnecting the longitudinal filaments are extruded through the slot due to the rocking motion of the second die part.

29. A method according to claim 28, wherein a continuous helical filament is extruded to interconnect the longitudinal filaments.

30. A method according to claim 24, wherein a film of material is co-extruded thorugh an additional extrusion slot and united with the extrusion produced through the annular slot.

31. An extruded product comprising a non-uniform sheet material produced in a substantially cylindrical configuration with at least one continuously longitudinally extruded element, said at least one element including a substantially tubular film, and an integral feature formed during the extrusion process extending helically along the tubular film.

32. An extruded product as claimed in claim 31, wherein said helical feature is a filament or a rib defined by an increase in thickness of extruded material.

33. An extruded product according to claim 31, wherein the product includes at least one continuous longitudinal filament.

34. An extruded product according to claim 33, wherein continuous longitudinal filaments and transverse filaments are formed on opposite sides of a co-extruded sheet of material, the material of the sheet being different to the material of the longitudinal filaments or to the material of the transverse filaments or to the material of the longitudinal filaments and the material of the transverse filaments.

35. An extruded product made by the method of claim 30.

* * * * *